United States Patent

Meade

[15] 3,675,393
[45] July 11, 1972

[54] DUST COLLECTING PROCESS

[72] Inventor: Reginald E. Meade, Stillwater, Minn.

[73] Assignee: The Pillsbury Company, Minneapolis, Minn.

[22] Filed: Feb. 20, 1970

[21] Appl. No.: 13,147

Related U.S. Application Data

[63] Continuation-in-part of Ser. No. 749,707, Aug. 2, 1968, abandoned.

[52] U.S. Cl. .................... 55/96, 55/97, 55/233, 55/268, 55/290, 99/204
[51] Int. Cl. .................... B01d 46/00
[58] Field of Search ........ 23/313; 55/96, 97, 90, 91, 55/268, 290, 223, 225, 226, 233; 209/45–47, 250; 34/26, 28, 29; 261/100, 101; 99/204

[56] References Cited

UNITED STATES PATENTS

| | | | |
|---|---|---|---|
| 1,697,647 | 1/1929 | Hancock et al. | 55/290 |
| 2,079,315 | 5/1937 | Dickerson | 55/293 |
| 2,350,011 | 5/1944 | Black | 55/96 |
| 3,102,035 | 8/1963 | Sanna | 99/DIG. 4 |
| 3,143,428 | 8/1964 | Reimers et al. | 23/313 |
| 3,251,695 | 5/1966 | Gidlow | 99/DIG. 4 |
| 3,395,518 | 8/1968 | Krane | 55/290 |
| 3,471,603 | 10/1969 | Patrick et al. | 23/313 |

FOREIGN PATENTS OR APPLICATIONS

| | | | |
|---|---|---|---|
| 965,968 | 8/1964 | Great Britain | 99/DIG. 4 |

*Primary Examiner*—Bernard Nozick
*Attorney*—Ronald E. Lund and James V. Harmon

[57] ABSTRACT

Prior dust filters exhibit an undesirable back pressure across the filter screen after a short period of operation. In the present invention droplets of liquid are introduced to a moving stream of gas that contains dust. The droplets make the dust particles cohere in three ways: (a) by the wetting of their surfaces; (b) dissolving potentially tacky solubles contained in the dust; and (c) by the deposition of an adhesive contained in the droplets of liquid but insufficient liquid is introduced to cause the particles to coalesce. A porous collecting element such as a woven metal screen extends entirely across the air stream. The air stream is forced through the collecting element while the particles are in a tacky coherent condition. The mat of dust particles which forms on the surface of the collecting member is maintained in a highly porous condition because the bonds that form between the dust particles hold the particles apart. The mat of dust itself acts as the filter medium. It is self-supporting, often friable and offers much less resistance to the flow of gas than the same dust particles in an unbonded condition.

11 Claims, 8 Drawing Figures

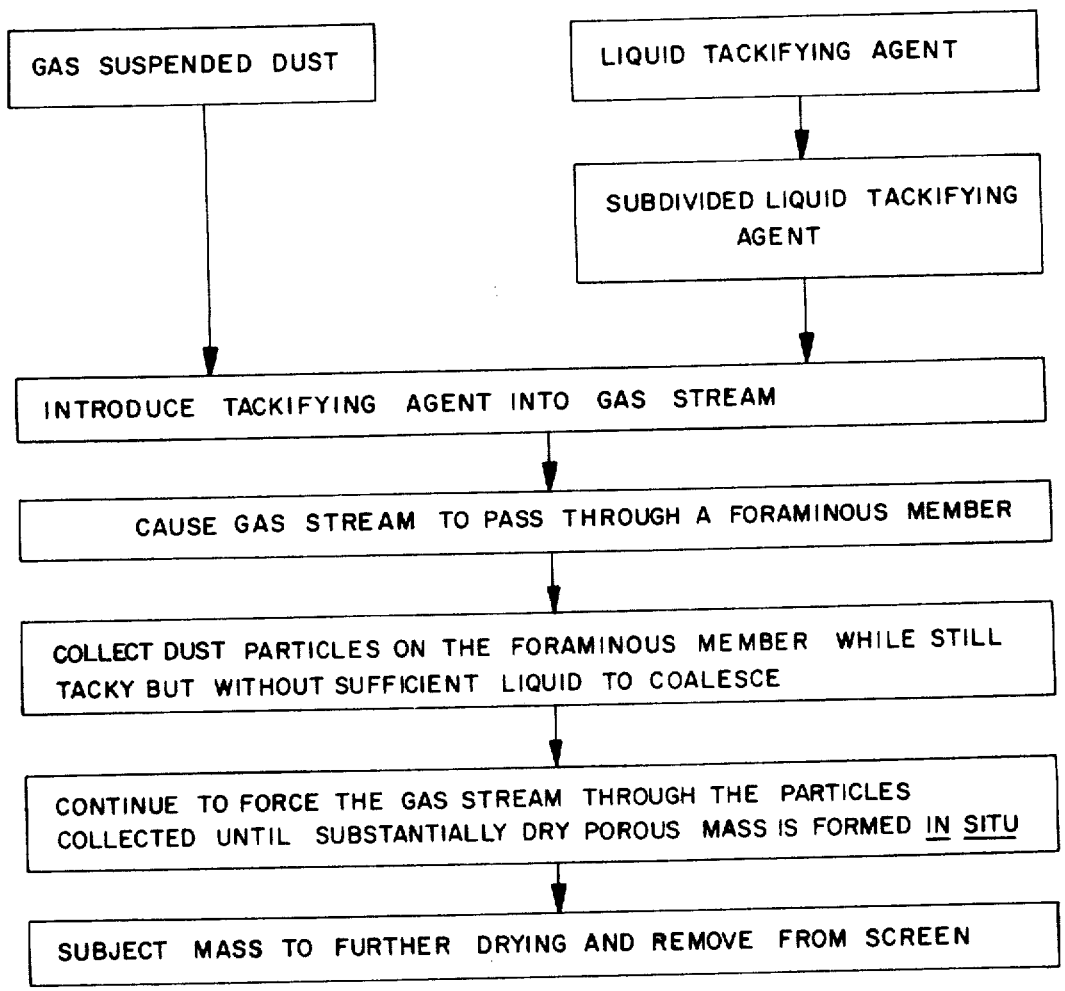
FIG 1
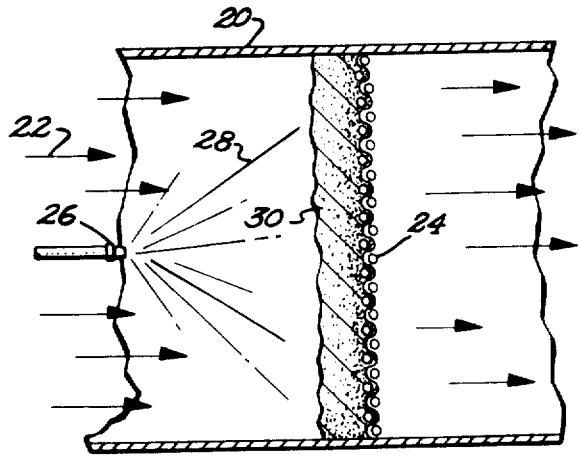
FIG 2
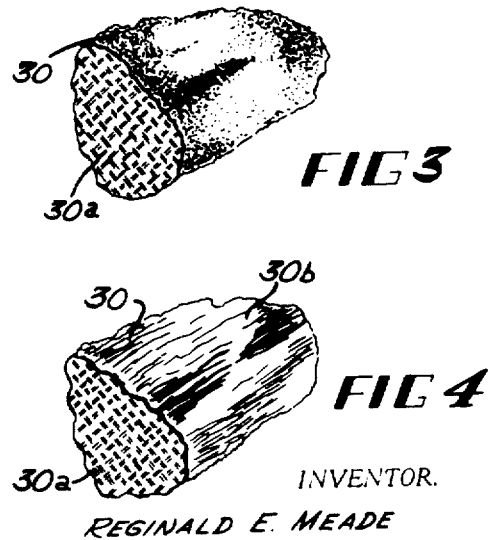
FIG 3
FIG 4
INVENTOR.
REGINALD E. MEADE
BY
ATTORNEY

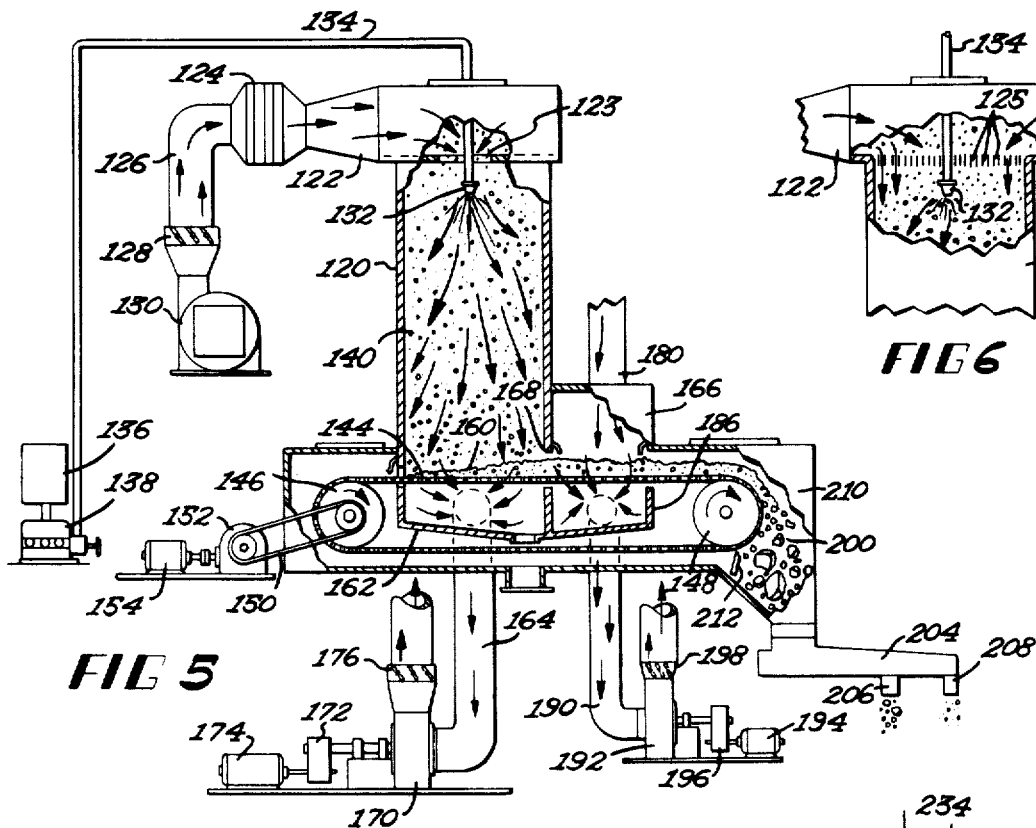
FIG 5
FIG 6
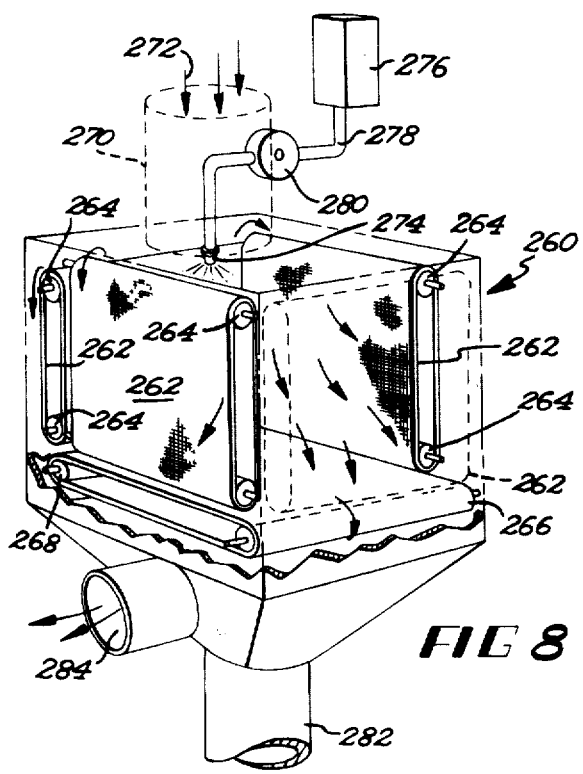
FIG 8
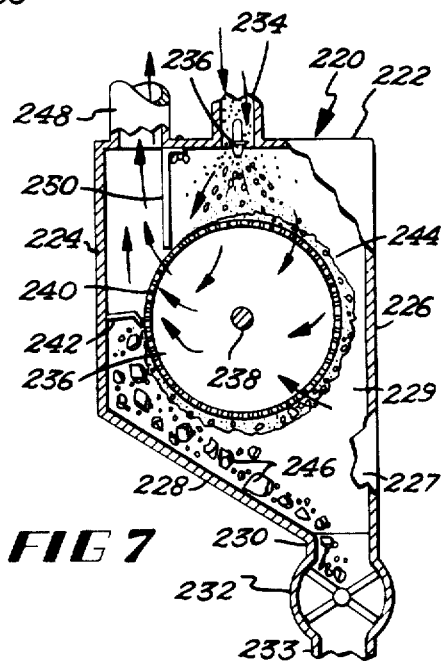
FIG 7
INVENTOR.
REGINALD E. MEADE
BY
ATTORNEY

DUST COLLECTING PROCESS

This application is a continuation-in-part of my prior application Ser. No. 749,707 which was filed on Aug. 2, 1968 now abandoned.

The present invention relates to a method for collecting dust present in gas streams to reduce air pollution as well as water pollution and to a method of preventing blockage of foraminous dust collecting members. The invention is particularly useful in removing and recovering dust present in the chemical, food or other industrial operations as well as for removing dust from air as in the case of industrial or household heating and air conditioning equipment.

The presence of dust such as flour dust in the air as well as airborne dust present in heating and cooling systems has been a problem in industry for many years. A variety of dust collection processes and devices have been previously proposed. Some of these processes employ fabric or fibrous non-woven filter elements which are objectionably bulky or produce excessive back pressures. These elements often become blinded after a relatively short period of operation. Other devices such as electrostatic filters are considered unsafe for certain operations because of the high voltages used and the possibility of electrical sparks. Cyclone filters, on the other hand, are ineffective for extremely fine particles which tend to remain suspended in air and in addition are relatively large in size and consequently expensive to produce. In processing a variety of food materials, a substantial quantity of dust passes through the dust collecting apparatus and must be vented outside the plant. The product that escapes is, of course, wasted.

It has been previously proposed to collect dust of various kinds on the screen or slat filters and to employ the collected dust itself as a filtering agent. Prior systems of this type have been generally unsuitable for two reasons. The first is that relatively large volumes of many kinds of dust pass through the filter either before material is deposited on the screen or after a deposit has formed. The other problem encountered is that certain types of particles tend to pack together to such an extent that the air flow through the screen is shut off in which event the operation must be interrupted.

In view of the deficiencies in the prior art, it is one object of the present invention to provide a highly effective dust collection process and apparatus of the type described.

A still further object of the present invention is the provision of an improved dust collection process and apparatus including the provision of a foraminous collecting screen positioned to receive the dust being collected and a means to prevent blinding of the screen and an associated interruption of air flow through the screen.

A still further object of the present invention is the provision of an improved dust filtration method and apparatus in which the dust is collected as a relatively loosely arranged mass or mat of dust particles adhesively bonded together and having a multiplicity of communicating pores between them whereby excessive back pressure across the filter medium is avoided.

These and other more detailed and specific objects will be apparent in view of the following specification and attached drawings wherein:

FIG. 1 is a flow chart showing the steps performed in a preferred embodiment of the invention.

FIG. 2 is a diagram illustrating the method employed in accordance with one embodiment of the invention.

FIG. 3 is a drawing illustrating the appearance of a portion of the dust collected upon the filter element of FIG. 2.

FIG. 4 is a perspective view showing the appearance of a portion of another mass of collected material after being removed from the filter element of FIG. 2.

FIG. 5 is a side elevational view partially broken away of an apparatus employed for carrying out the present invention.

FIG. 6 is a partial vertical sectional view of the top portion of the apparatus of FIG. 5 showing a modified air flow arrangement.

FIG. 7 is a side elevational view partly in section of still another embodiment of the invention.

FIG. 8 is a perspective view of another embodiment of the invention.

I have discovered that the foregoing objects and advantages of the present invention can be accomplished by employing a process which will now be briefly described with reference to FIG. 1. The dust to be collected is present in a moving gas stream. In some cases the dust will be natural airborne dust particles. In other cases it will consist of industrial dusts including those obtained from foods such as flour, dried powdered vegetable and fruit juices, milk, sugar or powdered chemicals, including pure elements, salts, resinous materials and in general any form of pulverulent dust.

A liquid comprises a second starting material. While the liquid will ordinarily be water, it can also consist of other polar liquids or of a non-polar liquid depending upon the material being collected. If desired, dissolved or suspended solids (for example, a fat) which function as an adhesive can be contained in the liquid, e.g. where such are used to provide adhesion for bonding the particles together. If no dissolved solids are present, the bonds are formed in one of several other ways: (a) the coming together of two wet surfaces which could, for example, be distilled water on the surfaces of the dust particles; (b) weak mechanical bonding, electron bonding or electrostatic bonding, e.g., as in NaCl dust or $SiO_2$ dust; and (c) the dissolving of potentially tacky solubles contained in the dust. The term "tacky" as used herein means capable of being held together by any of the forces described in this paragraph.

The gas stream in which the dust particles are entrained can be thought of as an additional starting agency. The gas stream will normally be heated sufficiently above room temperature so that the moisture level is well below its saturation point. The gas will then be able to perform a drying function in addition to a suspending function. The term "drying" as used herein is intended to mean at such conditions of temperature, pressure and vapor content as to be capable of receiving a substantial quantity of the activating liquid.

As a first step in the process, the liquid is introduced into the gas stream as droplets small enough so that the liquid portion of the droplets will readily contact and mix with the dust particles. For most practical applications of the invention, it is preferred that the droplets be small enough to remain suspended in the air stream. The liquid droplets then contact the dust particles and can be thought of as an activating liquid. Generally, the smaller the diameter of the droplets, other things remaining equal, the more rapidly and uniformly the particles will become moistened. Deposition can also be accomplished by condensation of vapor contained in the air stream. In this modification, the solids may be chilled sufficiently to condense the vapor on their exposed surfaces.

The gas stream together with the suspended moistened particulate material is next passed through a foraminous collecting member. As the gas passes through the foraminous member as well as and upon the mass of particles which has already been deposited on the foraminous member while the surfaces of the particles are still in a tacky condition but do not contain sufficient liquid to cause them to coalesce and form a relatively solid material. By the term "coalesce" as used herein I mean a flowing or fusing together of the particles to form a relatively dense material in which the individual particles cannot be clearly recognized and wherein the spaces or intervals between them are relatively small (if present at all) relative to the size of the particles. The dust particles are thus brought into contact with one another while the surfaces thereof are in a tacky condition. When the particles contact one another adhesive bonds are formed at the points of contact between the particles to produce relatively highly porous lacy reticulum in which a fairly high percentage of the dust mass thus formed consists of empty communicating spaces between the bonded particles. The flow of gas through the bonded particles continues until most of the remaining moisture or other liquid present on the surfaces of the particles is removed and the particles are bonded to one another at their points of contact. In this way a mass of particles is formed and becomes bonded together in situ upon the foraminous member, the suspending gas passing through the deposit to dry it.

The particles which have been deposited upon the foraminous member serve as a means for collecting freshly deposited particles. This phenomenon can be referred to as autofiltration. The packing together of accumulated particles has heretofore blocked off the flow of air which is, of course, undesirable. When dust particles are collected and bonded together in situ as described, it was discovered that blinding of the collection screen is substantially reduced. Accordingly, the flow of the drying atmosphere through the material deposited on the screen will continue without interruption. When the operation is finished and the accretion of material on the screen is completely dried, it can be removed from the screen in any suitable manner. While the mass of collected dust is exposed to vapor and minute air suspended water droplets, the collected particles are kept out of contact with additional moisture in liquid, i.e., fluid form which, if present, would soak and perhaps wash the collected material away. If this were allowed to occur, it could produce a water pollution problem.

Briefly, the apparatus in accordance with a preferred form of the invention includes a chamber into which the gas stream containing dust particles together with an atomized activating liquid is fed. This chamber communicates with a foraminous collection surface or screen. The screen is constructed to permit passage of the gas through itself while most of the solid particles entrained in the gas stream are deposited on the screen. The particles accumulate on the screen while tacky until a predetermined desired thickness is reached. The deposited material consists of a porous network of bonded particles having sufficient porosity to permit passage of the gas therethrough and acting as a filter bed for removing additional entrained dust particles.

In a preferred form of the invention a provision is made for moving the mobile collecting surface together with the bed of agglomerated particles from a drying area or zone to a second zone in which the relatively humid gas stream is prevented from contacting the accumulated material. In subsequent zones, the porous accretion is further dried and preferably cooled sufficiently to facilitate its removal. After the product has been removed, if the screen is a moving endless screen, it is then preferably reintroduced to the drying zone.

Refer now to FIGS. 2, 3, and 4. In FIG. 2 is shown a stationary enclosure or vessel 20 which in this instance forms a portion of a horizontally disposed duct. A gaseous suspending medium such as air 22 containing dust is forced through the duct from left to right and through a screen 24 which is supported to extend over the entire width of vessel 20, so that all of the air 22 must pass through it. Adjacent the screen 24 is a nozzle 26 which does not have to be directed toward screen 24 for providing a spray 28 of an activating liquid such as water. The dust particles to be collected mix with the spray 28 and collect on screen 24 as a highly porous mat 30.

The thickness of this deposit upon the screen will vary. I have found, for example, that when a vertical screen is employed, the thickness of the material deposited on the lower end of the screen is usually somewhat greater than at the top.

The appearance of the mat 30 removed from the screen 24 is clearly shown in FIGS 3 and 4. The surface 30a of the mass positioned adjacent to the screen 24 bears the configuration of the screen surface. If the material is relatively tacky at the time it was deposited, visible striations and channels 30b normal to the surface will be present as shown in FIG. 4. If the particles contain less moisture or are slightly tacky, the mat will have an irregular surface with no visible striations or markings as shown in FIG. 3.

While the activating liquid will ordinarily consist of water, it can also comprise a non-polar liquid such as an organic solvent. Where the dust being collected contains a hydrocolloid as in the case of a bakery mix product, a vegetable juice, fruit juice, milk or other dairy product, the activating liquid will ordinarily comprise water. Where a chemical material is being processed, a non-polar organic solvent such as a hydrocarbon liquid or other petroleum derivative, aldahyde, ketone or other solvent known to the art can be employed. Dissolved or suspended solids can be incorporated in the liquid as described above.

Any of a variety of dusty materials can be collected including both insoluble and soluble solids capable of being dried since it makes no difference if the dust contains a substance that is soluble in the activating liquid. If the porous mat is too physically weak to stay on the screen, then a small amount of an adhesive can be added to the activating liquid if desired. Thus, as mentioned briefly above, the invention contemplates the use of an atomized sticky liquid such as a thin syrup for bonding the dust particles together. They can comprise, for example, air-entrained dust of the type occurring naturally in the atmosphere, as well as solids which form true solutions, or colloidal suspensions. The term "dust" as used herein also includes air-suspended materials which sometimes exist as a liquid such as molten fat. It includes materials such as wheat flour that contain potentially tacky properties and those that do not, such as silicates.

The characteristics of the gas stream will now be described. It will normally consist of air having a relatively low moisture content but it can also consist of inert gas such as nitrogen, carbon dioxide or the like. If organic solvents are employed, an inert atmosphere will be preferred to prevent hazardous operation. When air is employed in connection with the invention, it is preferably heated, about 70° F. When food dust is being collected, the air is usually heated to above 100° F. but preferably less than about 800° F. While the preferred air temperature is from about 100° – 300° F., the temperature of the air need only be high enough to permit the drying atmosphere to receive and remove a portion of the liquid or solvent being evaporated. It must not, however, be so high as to melt the material that accumulates upon the screen.

In some forms of the invention, two drying atmospheres are employed; a first relatively high temperature gas to quickly evaporate the moisture or other solvent present in the product that is to be dried and a second relatively cool gas for quickly removing residual heat from the agglomerated dust mass on the collecting screen to eliminate any soft deformable or plastic character from the deposit on the screen and convert it to a relatively hard brittle and friable product which can be handled without sticking to exposed surfaces of the equipment which it contacts. In this manner, residual surface tack if present is removed and the product is made relatively stable and can be easily handled.

The foraminous collecting member is provided with openings which will in most instances be many times larger in diameter than the particles themselves. For example, in collecting dried milk dust, a woven screen having openings as large as one thirty-second inches to about one-eighth inch or more can be employed. When the operation is started, only a fraction of the dust will be deposited upon the wires of which the screen is composed. The material will gradually build up as a deposit upon the wires of the screen until the openings in the screen are entirely covered. The mat deposited upon the screen then acts as its own filter collecting and supporting medium.

It is important that the surfaces of the dust particles are tacky at the time they strike the screen or surface of the deposited material. If they are entirely dried and exhibit no tackiness, they will either pass entirely through the screen or will tend to pack the screen and block the flow of drying atmosphere through the screen which is, of course, undesirable. I have discovered that if the surfaces of the dust particles remain tacky when brought into contact with one another on the foraminous collecting screen, they will become bonded to one another in a relatively open network and will have sufficiently large spaces between themselves to allow a substantial flow of gas through the screen and the agglomerate. On the other hand, liquid should not be present in sufficient quantity so that the particles tend to coalesce and form a dense solid or liquid mass on the screen.

The tack of the particles depends upon several factors including the nature of the product, the amount of initial moisture present, the flow rate, temperature and vapor content of the drying atmosphere, the size of the liquid droplets, the amount of liquid present and the distance of the nozzle from the dust collection screen. The desired results and heat operating conditions are most easily obtained by moving the nozzle toward or away from the screen. Good results have been obtained by placing the nozzle from about six to thirty feet from the screen. At relatively short distances the dust particles will be wet and the particles will tend to coalesce. At too great a distance, the particles will be insufficiently tacky and will pack the screen.

Refer now to FIG. 5 which illustrates another embodiment of the invention. The apparatus of FIG. 5 comprises a chamber or vessel such as a vertically disposed housing 120 communicating through an inlet port 123 with a supply duct 122 and a heater 124 which in turn communicates through a duct 126 with a damper 128 to which air containing the dust that is to be collected is supplied by blower 130. Mounted concentrically within the upper end of housing 120 is a nozzle 132. The activating liquid is supplied to nozzle 132 through a pipe 134. The liquid is supplied from a storage tank 136 by means of a pump 138. The liquid sprayed from the nozzle 132 is initially present in the form of wet droplets 140. These droplets are suspended in the stream of dust particles and air passing downwardly through housing 120. As the dust particles fall, they become moistened and strike a foraminous collecting element or screen 144 wrapped over a pair of horizontally disposed spaced rollers 146 and 148, the former being driven by means of a belt 150 connected to a speed reducer 152. The speed reducer is in turn operated by means of a motor 154. The screen has the form of an endless belt and can comprise a variety of materials such as a woven wire screen or perforated metal sheet. A variety of other screen materials will be apparent to those skilled in the art.

As clearly shown in FIG. 5, a mat of dust 160 forms on the upward surface of the screen 144. The air flowing into the chamber 120 from the duct 122 passes through the mat 160 as indicated by arrows into a compartment 162 below the screen and is exhausted through a duct 164. The duct 164 is connected to an exhaust blower 170 driven by the provision of a speed reducer 172 and motor 174. From the blower 170 the air passes through a suitable manually controllable damper 176 which like damper 128 can be opened or closed as conditions of operation require.

The foraminous screen 144 is moved so that its upper surface travels toward the right as seen in FIG. 5 thereby carrying the mat into a second chamber 166 through an opening 168. The chamber 166 communicates with an inlet duct 180 connected to an air cooler 182 of any suitable known construction. On the opposite side of the screen 144 from the chamber 166 is a chamber 186 which communicates with an outlet duct 190 to a blower 192 driven by means of motor 194 coupled through a speed reducer 196. Air passing through the blower 192 is exhausted through a flow control damper 198. The foraminous member 144 and the rollers are mounted within a chamber 210. At the lower end of the chamber 210 a doctor knife 212 is provided for scraping the dust from the screen 144 before it returns to the inlet end of the chamber 120.

During operation, as the screen 144 travels over the rollers 146 and 148, the dust mat breaks into chunks 200 which pass downwardly into a collecting trough 204. When the mat is to be used for some purpose, a suitable sifter can be provided for separating and grading chunks of different sizes and exhausting them through a pair of ducts 206 and 208.

A slightly modified form of air flow control is shown in FIG. 6. This flow control consists of a grating 125 consisting of a plurality of closely spaced parallel vertically disposed louvers for maintaining a laminar air flow from the duct 122 into chamber 120. By the provision of a laminar air flow, the turbulence within the chamber 120 will be substantially reduced and the accumulation of dust on the side walls of chamber 120 will be substantially reduced. It should also be noted that laminar flow will continue without interruption through the entire chamber 120 and that the flow through the foraminous collecting member 144 will also be laminar.

Refer now to FIG. 7 which illustrates another embodiment of the invention. As shown in FIG. 7, there is provided a chamber 220 having a top wall 222, side walls 224, 226, 227 and 229, inclined lower wall 228 and outlet duct 230 which communicates with a star valve 232. A gas containing dust is introduced through an inlet duct 234 at the upward end of the chamber 220. Adjacent the duct 234 is provided a spray nozzle 236 through which an activating liquid is supplied. Mounted for rotation within the chamber 220 is a cylindrical collecting drum 236 supported on a center shaft 238. The shaft is suitably journalled in the walls 227 and 229 and driven at a uniform speed in a clockwise direction as seen in FIG. 7. The cylindrical wall of the drum 236 comprises a foraminous member 240 which can consist, for example, of perforated sheet metal. A doctor blade 242 is mounted within the housing 220 in position to scrape dust 244 which has accumulated on the surface of the drum as shown. The porous chunks and pieces 246 removed by the blade 242 fall downwardly along the inclined surface 228 into the star valve 232 and are exhausted through the duct 233.

Upon the upper wall 222 is provided an exhaust duct 248. Extending downwardly between the exhaust duct 248 and the inlet duct 234 is a baffle 250 the lower end of which contacts the upward surface of the drum 240. In this manner, the air passing through the duct 234 must pass through the mat 244 to the interior of the drum before being exhausted. The air then passes through the drum section between the doctor blade 242 and the baffle 250 and is exhausted through the duct 248.

Refer now to FIG. 8 which shows still another embodiment of the invention. A drying chamber 260 is provided with connected side, top and bottom walls. On each of the walls is mounted a foraminous collecting element, each of which consists of an endless screen entrained over a pair of horizontally disposed vertically spaced rolls 262 and 264. On the bottom of the chamber is provided a similar collection surface comprising an endless screen 266 entrained over horizontally spaced rolls 268. A suitable driving means is provided for turning each of the rolls in given feed directions. At the upper end of the apparatus is provided an inlet duct 270 for conveying air and entrained dust 272 to the upward end of the apparatus. A spray nozzle 274 is provided at the upward end of the chamber 260. The activating liquid is supplied to nozzle 274 from a storage container 276 through a duct 278. A metering pump 280 controls the flow of fluid from the storage container 276 to the nozzle 274.

During operation the air and dust 272 passing through into the chamber 260 flows downwardly and outwardly through each of the screens 262. Material expelled from the nozzle 272 moistens the dust. The dust then accumulates on the inward surfaces of each of these foraminous collecting members 262. The solid material collecting on the surface through each of the screens either falls from the screens as the screens pass over the rolls or can be removed therefrom by means of a doctor blade (not shown). After being removed, the agglomerated dust falls downwardly and is discharged through a duct 282. The gas stream is discharged through a duct 284.

The apparatus of FIG. 8 has the advantage that all of the exposed walls are covered by one of the foraminous collecting surfaces. This effectively prevents the walls of the container 260 from being covered with the cakes of dried dust.

In order to evaluate the effectiveness of the invention, cylindrical cores were cut from the accumulated mat. These cores were placed in a chamber or cell of the same size and were sealed to the side wall of the cell. Air was then forced through the cell and the pressure drop across the core was measured. For comparative purposes, other portions of the same mat were subjected to light agitation sufficient to reduce the mat to a powder having a particle size of less than 840$\mu$ (less than 20 mesh U.S. screen size). The resulting powder was then placed in a similar cell. The powder was then compressed lightly in the cell to the same bulk density as in the cores. It was surprising to find that the pressure drop through the cells containing the repacked material was much higher than in the same material before being repacked.

This phenomenon is demonstrated by the following test results. A cylindrical core cut from a mat composed of whole milk powder collected in accordance with the invention exhibited a pressure differential of 60 dynes/cm$^2$ per cm. of bed depth per cm/second (of air velocity). The repacked material, on the other hand, exhibited a back pressure of 270 dynes/cm$^2$ per cm. of bed depth per cm./second (of air velocity). In another test made with cores removed from a mat composed of whole milk powder typical cores exhibited a pressure drop of from 82 – 105 dynes/cm$^2$ per cm. of bed depth per cm./second (of air velocity). By contrast, the repacked material exhibited a pressure drop of from 257 – 261 dynes/cm$^2$ per cm. of bed depth per cm./second (of air velocity). The bulk density in each case was about 0.164.

Other unexpected results were noted. In several of the materials tested when the mat was reduced to a powder by mild agitation, then placed in a tube and levelled without the application of pressure, the bulk density of the material in the tube was greater than the bulk density of the mat from which the powder was derived. This again is indicative of the effectiveness of the invention in collecting gas suspended particulate material in a highly porous form which is, of course, desirable since it lessens the back pressure developed across the collection screen.

The invention will be better understood by reference to the following examples which illustrate preparation of specific products in accordance with my invention and employing an apparatus of the type illustrated in FIG. 2.

EXAMPLE I

Flour entrained in an air stream is removed in the following manner. A stream of air containing suspended flour particles is passed through a heater until its temperature has reached about 325° F. About 114 parts of water by weight is sprayed continuously onto the stream for each 100 parts of flour. The flour particles are collected when in a tacky condition on a woven wire screen having openings of about one-sixteenth inches in width.

The moisture content of the deposited may may be about 6 percent. It will be porous, friable and will consist of a multiplicity of microscopic particles bonded together at their points of contact and having a multiplicity of interconnecting passages extending from the influent to effluent surfaces. It will be dry to the touch and can be crushed to pieces of any desired size.

EXAMPLE II

A dusty material produced in the process of making a dry cake mix is collected and removed from an air stream in the same manner as described in Example I with the following changes. The air stream is heated to a temperature of from about 315° to 325° F. and is introduced at the rate of 2,500 CFM. Water is heated to 125° F. and sprayed into the stream at a distance of about 10 feet from the collecting screen in the same ratio as described above. The moisture content of the porous, friable mat formed on the screen may be about 2.3 percent by weight.

EXAMPLE III

Dried, powdered milk dust is removed from an air stream as in Example I with the following changes. About 60 parts of water are sprayed into the stream of air and milk dust for each 40 parts by weight of solids. The moisture content of the friable porous mat collected on the screen may be about 6 percent by weight.

It is apparent that many modifications and variations of this invention as hereinbefore set forth may be made without departing from the spirit and scope thereof. The specific embodiments described are given by way of example only and the invention is limited only by the terms of the appended claims.

EXAMPLE IV

Furnace stackgas containing a large amount of fly ash at a temperature of about 400° – 600° F. is exhausted into a collection chamber of the kind described in FIG. 5. Into the chamber is sprayed an aqueous solution of molasses at a concentration of from 3 to 10 percent solids. A sufficient quantity of the solution is used to reduce the temperature of the gas to a level below its dew point to provide for condensation of the liquid on the fly ash particles in the air stream. The collection screen is composed of a corrosion resistant material such as nickel or 316 stainless steel having an open area of about 50 percent with holes of 18 mesh.

I claim:

1. A method or removing dust of the kind which becomes sticky when moistened from a gas stream comprising providing an activating liquid and a foraminous collecting member, reducing the activating liquid to minute droplets of a size capable of being suspended in air by spraying the liquid into the gas stream, dispersing the droplets in the gas stream, exposing the gas containing said dust to said dispersed droplets of liquid to render the surfaces of the dust tacky, causing the gas to pass through the foraminous member to collect essentially all of the dust particles on the foraminous member while the particles are tacky but without sufficient liquid present to cause the dust particles to coalesce or flow after striking the foraminous member until bonds are formed between the particles and said bonds are solidified in situ on the surface of the foraminous collecting member to thereby form a self supporting porous mat which functions as a filter for collecting additional tacky particles, maintaining the particles upon the collecting member out of contact with additional moisture in liquid form after being deposited on the collecting member, forcing a gas through the collected dust mat and thereafter removing the mat from the foraminous member.

2. The method of claim 1 wherein the finished mat is forceably removed from the foraminous member.

3. The method of claim 1 wherein the particles impinge against one another and form adhesive bonds at the points of contact between the partially dried surfaces of the dust particles and form relatively large communicating spaces between the bonded particles.

4. The process of claim 3 wherein the gas is heated prior to passing through the foraminous member.

5. The process of claim 1 wherein a relatively cool, dry gas is passed through the mat deposited upon the collecting member to render it substantially dry to the touch.

6. A method of removing dust of the kind which becomes sticky when moistened from a gas stream comprising providing a gas stream containing dust, providing an activating liquid, providing a gaseous drying medium and a foraminous collecting member, spraying the liquid into the stream to disperse the liquid therein as minute droplets that cause the dust particles to cohere, causing the gas stream to pass through the foraminous collecting medium while the dust particles are in a tacky condition whereby the tacky surfaces of the dust particles contact one another and thereby cause bonds to form at the points of contact between their partially dried surfaces thereby collecting essentially all of the dust particles on the foraminous medium to form a dust mat which collects additional tacky particles, maintaining the dust mat upon the collecting member out of contact with additional moisture in liquid form after being deposited on the collecting member, thereafter drying the dust mat on the collecting member to rigidify the bonds between said particles by forcing at least a substantial fraction of a gas introduced through the mat deposited upon the foraminous collecting member.

7. The method of claim 6 wherein the collecting member comprises a screen containing openings many times larger than the openings present in the mat.

8. The method of claim 6 wherein the gas is heated to a temperature between about 70° and 800° F.

9. The process of claim 6 wherein the liquid is water.

10. The method according to claim 6 in which the mat formed on the foraminous collecting member is cooled before being removed therefrom.

11. The process according to claim 6 wherein cooling is carried out by passing a chilled gas through the mat present on the foraminous collecting medium until the temperature thereof has been substantially reduced to render said product stable and non-tacky.

* * * * *